(12) United States Patent  
Wang

(10) Patent No.: US 8,161,233 B2  
(45) Date of Patent: Apr. 17, 2012

(54) MULTI-STREAM RESTORE SYSTEM AND METHOD

(75) Inventor: Hao Wang, Beijing (CN)

(73) Assignee: Computer Associates Think, Inc., Islandia, NY (US)

( * ) Notice: Subject to any disclaimer, the term of this patent is extended or adjusted under 35 U.S.C. 154(b) by 449 days.

(21) Appl. No.: 12/465,018

(22) Filed: May 13, 2009

(65) Prior Publication Data

US 2010/0293329 A1 Nov. 18, 2010

(51) Int. Cl.
*G06F 12/00* (2006.01)

(52) U.S. Cl. ............... 711/112; 711/162; 711/163

(58) Field of Classification Search .......... 711/112, 711/162, 718, 163, 165, 173
See application file for complete search history.

(56) References Cited

U.S. PATENT DOCUMENTS 6,842,833 B1 * 1/2005 Phillips et al. ............... 711/162

* cited by examiner

*Primary Examiner* — David Lam
(74) *Attorney, Agent, or Firm* — Schwegman, Lundberg & Woessner, P.A.

(57) ABSTRACT

A computer system and process restores files on multiple disk drives from a plurality of backup files on a plurality of media types and at a plurality of locations. The system receives at a processor a restore command, and partitions the restore command into two or more sub-jobs. The system determines a location for each of the plurality of media types, and matches each sub-job with a different media type at a different location. The system then restores the files from each different media type at a different location to the multiple disk drives in parallel.

20 Claims, 4 Drawing Sheets

MULTI-STREAM RESTORE SYSTEM AND METHOD

TECHNICAL FIELD

The present invention relates to a system and method to restore computer files from backups, and in an embodiment, but not by way of limitation, to systems and methods to restore computer files from backups that reside on multiple sources.

BACKGROUND

Backing up computer files and databases many a time is done on multiple targets, thereby resulting in more than one copy of a backup. Such multiple backups can reside on different media such as an inline copy, a disk drive, or a tape. Additionally, the process of backing up files to these different media can include a disk to disk to tape (D2D2T) process, a disk to tape to tape (D2T2T) process, and a grandfather-father-son process.

SUMMARY

Figure 1A:
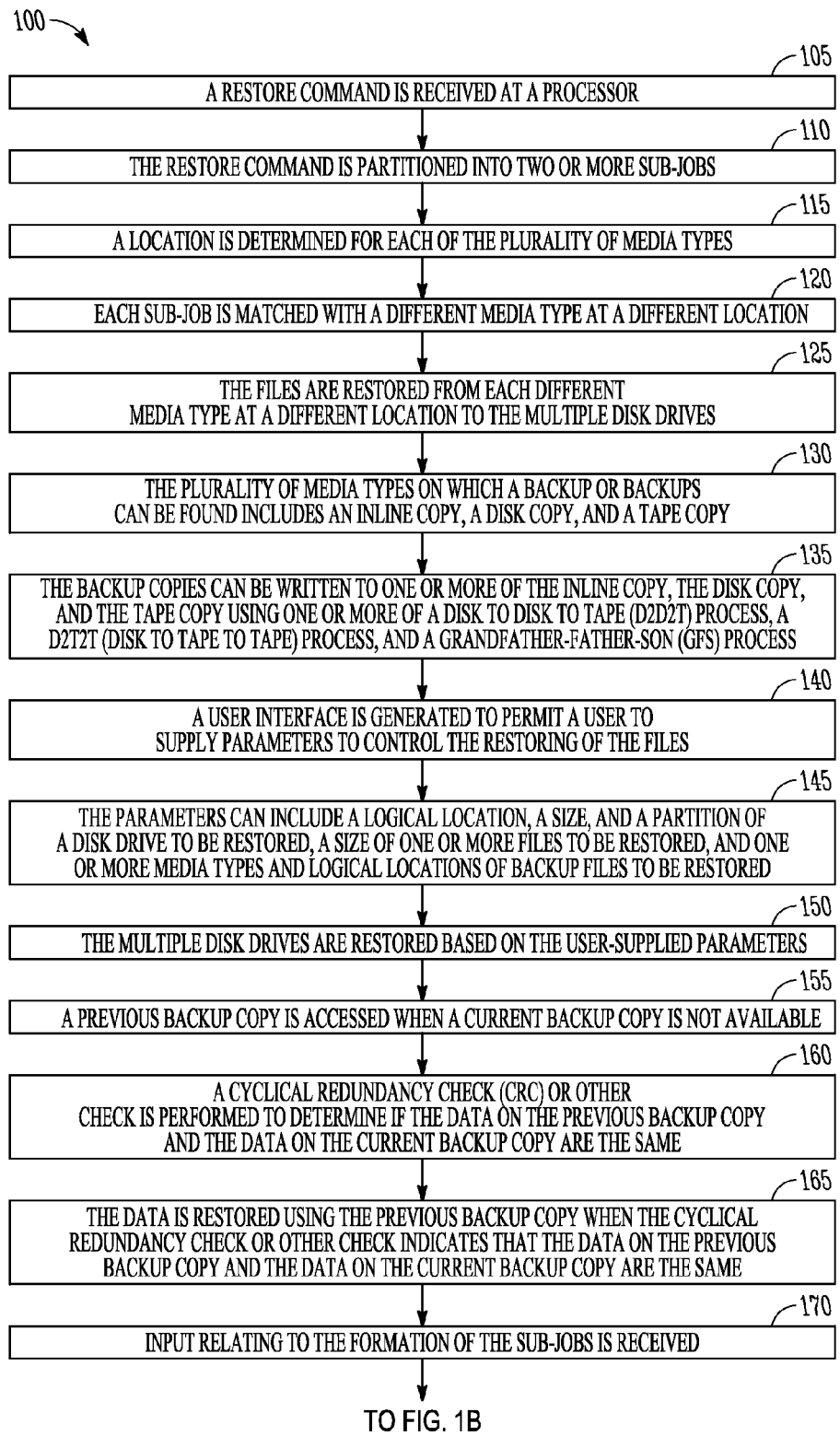
FIGS. 1A and 1B are a flowchart of an example embodiment of a process to restore data files from a plurality of backup sources.

In an embodiment, a computerized process restores files on multiple disk drives from a plurality of backup files on a plurality of media types and at a plurality of locations. The computerized process first receives a restore command. The process then partitions the restore command into two or more sub-jobs. The process determines a location for each of the plurality of media types, and matches each sub-job with a different media type at a different location. The files are restored from each different media type at a different location to the multiple disk drives in parallel.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In many file backup situations, when a backup is made, the backup is written to more than one location, and the different locations can include different media types such as an inline copy, a disk drive, or a tape copy. An embodiment of the present disclosure determines the best, i.e. fastest, manner in which to restore/retrieve backed up data. In an embodiment, when a user requests that a file be restored, the system will first partition the restore command into two or more sub-jobs. This partitioning can be based on several factors including the size of the backup and/or the target file, disk partitions of the backup and/or target file, and other pertinent factors. The system will then determine all of the available media types and the locations of those media types for the particular file to be restored. This can be determined by reading a database that maintains this information. The sub-jobs are then each matched with a particular media type at a particular location, and the file is restored by each sub-job working in parallel.

An embodiment of the present disclosure also creates a cyclical redundancy check (CRC), or some other type of check, when a volume and/or file is backed up. This check includes a timestamp or indicator, and is maintained in the database for each file and for each volume (such as C drive, D drive, etc.) for every file that is backed up. A check indicator is also appended to each backup file and/or volume on the actual backup media. Then, when a file is restored, the check indicator from the volume level to the file level is compared on the files and/or volumes in the database to the check indicator on the files and/or volumes from the backup media. In this manner it can be determined which backup is the correct one to use for a restore. Also, if a file and/or volume needs to be restored from a past history, that is, not the latest backup, the check indicator that indicates that particular version of the file and/or volume is compared with the check indicators on the backup media to locate the correct backup. This provides the capability to restore a history file and/or volume using a multi-stream restore since different backup media can be used in parallel fashion.

Figure 1B:
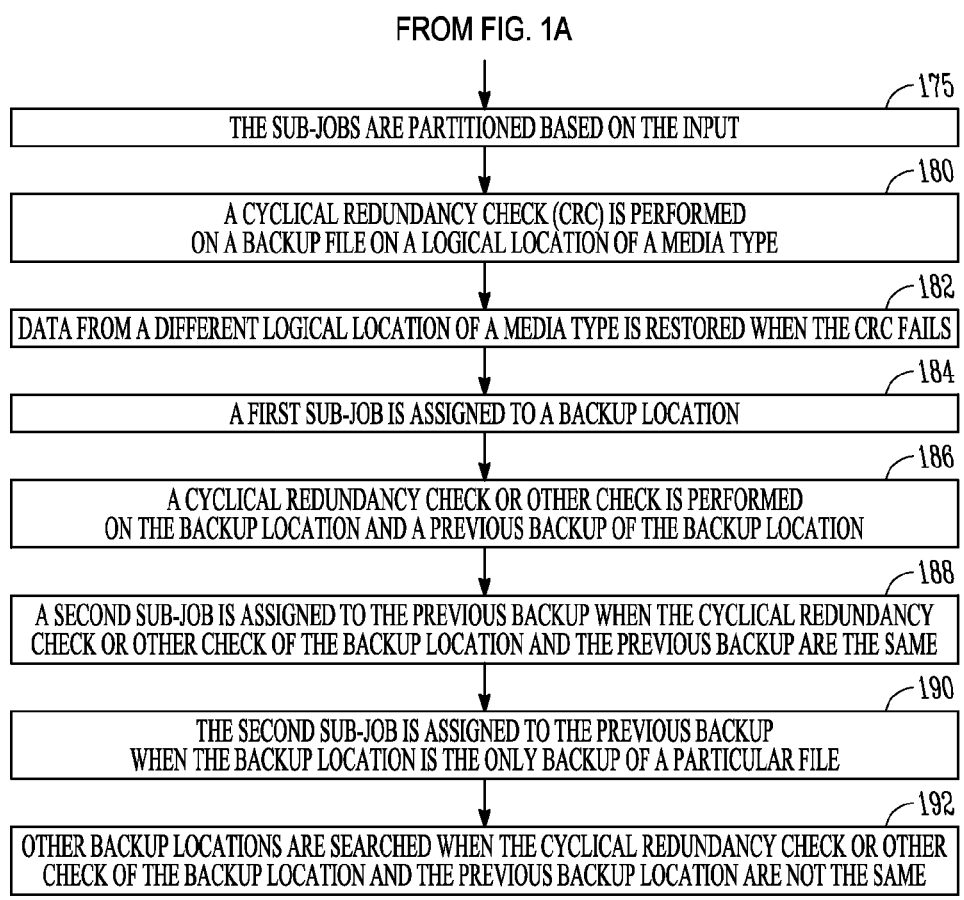

FIG. 1 is a flowchart of an example process 100 for restoring computer files from backup files that are resident on multiple sources and/or locations. FIG. 1 includes a number of process blocks 105-192 that are identified by unique numbers. Though arranged serially in the example of FIG. 1, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 1, the computerized process 100 is a process for restoring files on multiple disk drives from a plurality of backup files on a plurality of media types and at a plurality of locations. At 105, a restore command is received at a processor. At 110, the restore command is partitioned into two or more sub-jobs. At 115, a location is determined for each of the plurality of media types. At 120, each sub-job is matched with a different media type at a different location. After the matching, at 125, the files are restored from each different media type at a different location to the multiple disk drives. The restoration of the files is performed in parallel.

Continuing with the process 100 in FIG. 1, at 130, the plurality of media types on which a backup or backups can be found includes an inline copy, a disk copy, and a tape copy. The backups can be found at these different media types because many a time, during a normal back procedure, as indicated at 135, the backup copies are as a matter of course written to one or more of an inline copy, a disk copy, and a tape copy. The writing of a backup to these different media can be accomplished using one or more of a disk to disk to tape (D2D2T) process, a D2T2T (disk to tape to tape) process, and a grandfather-father-son (GFS) process. Since these backup protocols are ubiquitous in data processing environments, the multiple copies from which to restore files are readily available.

At 140, a user interface is generated to permit a user to supply parameters to control the restoring of the files. At 145, it is noted that the parameters can include a logical location, a size, and a partition of a disk drive to be restored, a size of one or more files to be restored, and one or more media types and logical locations of backup files to be restored. At 150, the multiple disk drives are restored based on the user-supplied parameters.

At 155, a previous backup copy is accessed when a current backup copy is not available. A current backup copy may not be available for example because it is opened by another process, or because a backup tape has been misplaced or lost. A previous backup copy may also be accessed because an earlier history backup is required. At 160, a cyclical redundancy check (CRC) or other check is performed to determine if the data on the previous backup copy and the data on the current backup copy are the same. That is, is this backup version the one that is required. Then, at 165, the data is restored using the previous backup copy when the cyclical redundancy check or other check indicates that the data on the previous backup copy and the data on the current backup copy are the same (indicating this is the correct version to restore).

At 170, input relating to the formation of the sub-jobs is received, and at 175, the sub-jobs are partitioned based on the input. At 180, a cyclical redundancy check (CRC) is performed on a backup file on a logical location of a media type, and at 182, data from a different logical location of a media type is restored when the CRC fails.

At 184, a first sub-job is assigned to a backup location. At 186, a cyclical redundancy check or other check is performed on the backup location and a previous backup of the backup location. At 188, a second sub-job is assigned to the previous backup when the cyclical redundancy check or other check of the backup location and the previous backup are the same. In some instances, as indicated at 190, the second sub-job is assigned to the previous backup when the previous backup location is the only backup of a particular file. This could occur if the backup tape is misplaced or lost, and the only option is to access the previous backup. At 192, other backup locations are searched when the cyclical redundancy check or other check of the backup location and the previous backup location are not the same.

Figure 2:
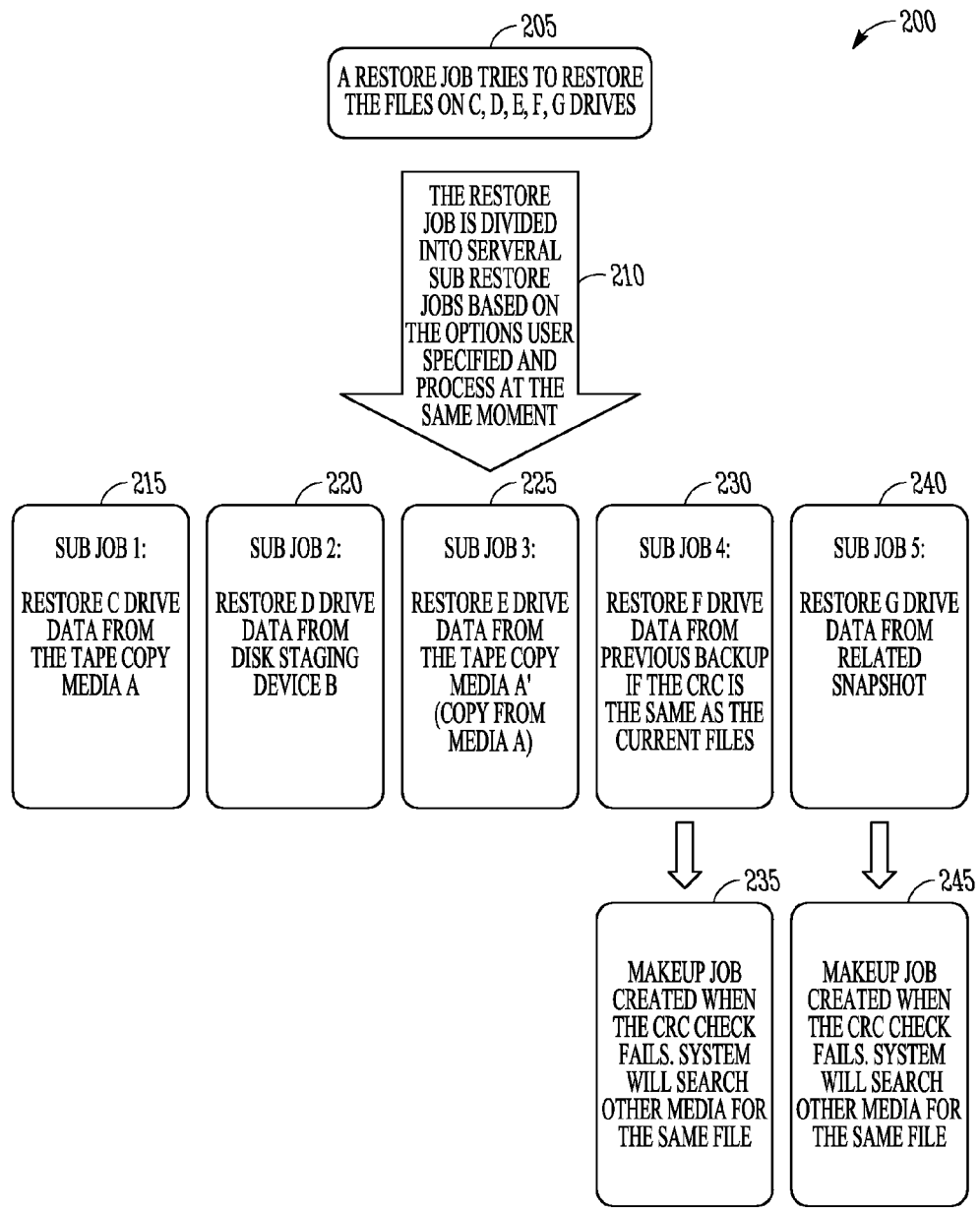
FIG. 2 is a block diagram of an example process to restore data files from a plurality of backup sources.

FIG. 2 illustrates a block diagram of an example embodiment of a process 200 to restore data files onto a multi-drive system from a plurality of backup locations. As illustrated at 205, a plurality of files are to be restored on a multi-drive system. The multiple drives are identified as the C, D, E, F, and G drives. At 210, several restore sub-jobs are created. In the example of FIG. 2, these sub-jobs are created based on parameters or options supplied by a user. As noted previously, these parameters generally relate to the size and location of the disk drives and the size and location of the backup sources. These parameters can also include a specific version of a file and/or volume to be restored.

As illustrated in FIG. 2, at 215, sub-job 1 is created to restore the C drive data. In the example of FIG. 2, the data to restore is located on a tape media that is referred to as Media A. At 220, sub-job 2 is created to restore data to the D drive. According to FIG. 2, this data can be found on a disk staging device B. At 225, sub-job 3 is created to restore data to the E drive. This data is retrieved from a tape copy media A', which is a copy or previous backup of the backup Media A.

At 230, sub-job 4 is created to restore data to the F drive. As indicated at 230, the user has specified that the backup for the F drive be taken from a previous backup of the F drive. However, before this can be done, a CRC or other check is performed on the backup and previous backup to verify that there are no differences between the two backups. A user can also specify a previous backup simply because that is the version of the file that the user would like to restore. In such a case, the CRC or other check must indicate that this previous backup is the version that the user is seeking. If the CRC check fails at 230, then as indicated at 235, a makeup sub-job is created that will search other media for the same file or files.

At 240, sub-job 5 is created to restore data to the G drive. As indicated at 240, this data is retrieved from a related snapshot. As indicated at 245, a makeup job is created if a CRC check of the related snapshot failed, and other media will be searched for the needed files.

When restoring, if a volume check is correct, then every file in the volume is the correct version for the restore, and the entire volume can be restored. However, if the check at the volume level fails, each file in the volume will be checked. If a file's check is correct, then that file can be restored. If a file's check fails, a makeup job is created for this file and all other files in the volume that failed the check. The makeup job is only for the files that did not pass the check; the makeup job is not for the entire volume. In an embodiment, since individual file checks can consume a good deal of time (when the volume check fails), the file check can be bypassed. When the bypass of the file check is enabled, the makeup job will simply search other media when the volume check fails.

Figure 3:
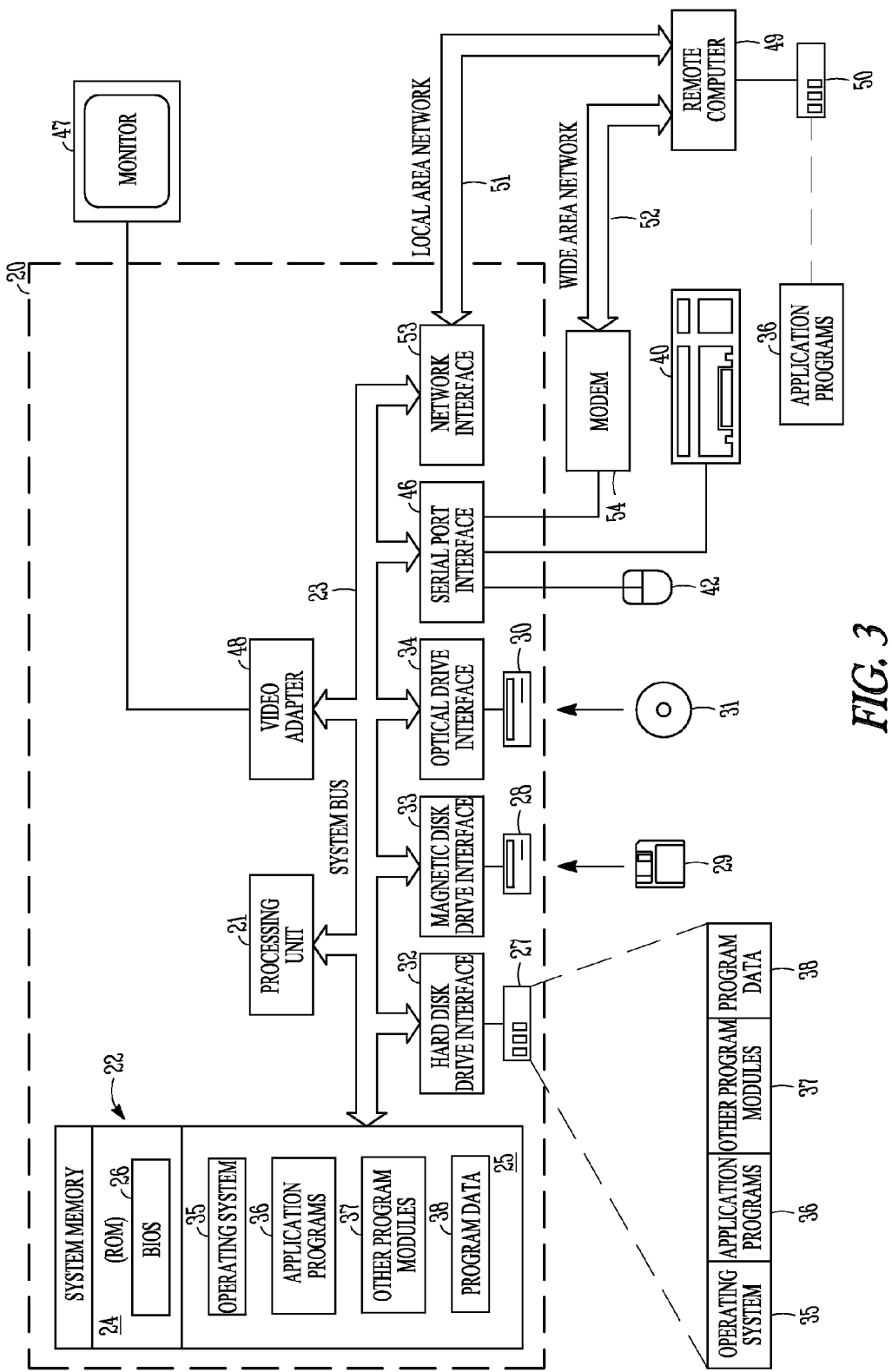
FIG. 3 is a block diagram of an example embodiment of a computer system upon which embodiments of the present disclosure can operate.

FIG. 3 is an overview diagram of a hardware and operating environment in conjunction with which embodiments of the invention may be practiced. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, program modules may be located in both local and remote memory storage devices.

In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/0 relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The invention claimed is:

1. A computerized process for restoring files on multiple disk drives from a plurality of backup files on a plurality of media types and at a plurality of locations comprising:
   receiving at a processor a restore command;
   partitioning the restore command into two or more sub-jobs;
   determining a location for each of the plurality of media types;
   matching each sub job with a different media type at a different location; and
   restoring the files from each different media type at a different location to the multiple disk drives in parallel.

2. The computerized process of claim 1, wherein the plurality of media types comprises one or more of an inline copy, a disk copy, and a tape copy.

3. The computerized process of claim 2, comprising writing the plurality of backup files to one or more of the inline copy, the disk copy, and the tape copy using one or more of a disk to disk to tape D2D2T) process, a D2T2T (disk to tape to tape) process, and a grandfather-father-son (GFS) process.

4. The computerized process of claim 1, comprising generating a user interface to permit a user to supply parameters to control the restoring of the files; wherein the parameters comprise a logical location, a size, and a partition of a disk drive to be restored, a size of one or more files to be restored, and one or more media types and logical locations of backup files to be restored.

5. The computerized process of claim 4, comprising restoring the multiple disk drives based on the user-supplied parameters.

6. The computerized process of claim 1, comprising:
   selecting a backup copy to restore that was created prior in time to a most recent backup copy;
   accessing the previous backup copy;
   performing a cyclical redundancy check (CRC) or other check to determine if the previous backup copy is a correct version of the file to be backed up; and
   restoring the data using the previous backup copy when the cyclical redundancy check or other check indicates that the data on the previous backup copy is the correct data.

7. The computerized process of claim 1, comprising:
   accessing a previous backup copy when a current backup copy is not available;
   performing a cyclical redundancy check (CRC) or other check to determine if the data on the previous backup copy and the data on the current backup copy are the same; and
   restoring the data using the previous backup copy when the cyclical redundancy check or other check indicates that the data on the previous backup copy and the data on the current backup copy are the same.

8. The computerized process of claim 1, comprising:
   receiving input relating to the formation of the sub-jobs; and
   partitioning the sub jobs based on the input.

9. The computerized process of claim 1, comprising;
   performing a cyclical redundancy check (CRC) on a backup file on a logical location of a media type; and
   restoring data from a different logical location of a media type when the CRC fails.

10. The computerized process of claim 1, comprising:
    assigning a first sub job to a backup location;
    performing a cyclical redundancy check or other check on the backup location and a previous backup of the backup location; and
    assigning a second sub job to the previous backup when the cyclical redundancy check or other check of the backup location and the previous backup are the same.

11. The computerized process of claim 10, wherein the second sub job is assigned to the previous backup when the previous backup location is the only backup of a particular file.

12. The computerized process of claim 10, comprising searching other backup locations when the cyclical redundancy check or other check of the backup location and the previous backup location are not the same.

13. A non-transitory machine readable medium comprising instructions to execute a process comprising restoring files on multiple disk drives from a plurality of backup files on a plurality of media types and at a plurality of locations, the process comprising:
    receiving at a processor a restore command;
    partitioning the restore command into two or more sub-jobs;
    determining a location for each of the plurality of media types;
    matching each sub job with a different media type at a different location; and
    restoring the files from each different media type at a different location to the multiple disk drives in parallel.

14. The non-transitory machine readable medium of claim 13, further comprising instructions for:
    accessing a previous backup copy when a current backup copy is not available;
    performing a cyclical redundancy check (CRC) or other check to determine if the data on the previous backup copy and the data on the current backup copy are the same; and
    restoring the data using the previous backup copy when the cyclical redundancy check or other check indicates that the data on the previous backup copy and the data on the current backup copy are the same.

15. The non-transitory machine readable medium of claim 13, further comprising instructions for:
    performing a cyclical redundancy check (CRC) on a backup file on a logical location of a media type; and
    restoring data from a different logical location of a media type when the CRC fails.

16. The non-transitory machine readable medium of claim 13, further comprising instructions for:
    assigning a first sub job to a backup location;
    performing a cyclical redundancy check or other check on the backup location and a previous backup of the backup location; and assigning a second sub job to the previous backup when the cyclical redundancy check or other check of the backup location and the previous backup are the same.

17. A system comprising a processor configured to execute a process comprising restoring files on multiple disk drives from a plurality of backup files on a plurality of media types and at a plurality of locations, the processor configured to:
  receive at the processor a restore command;
  partition the restore command into two or more sub-jobs;
  determine a location for each of the plurality of media types;
  match each sub job with a different media type at a different location; and
  restore the files from each different media type at a different location to the multiple disk drives in parallel.

18. The system of claim 17, wherein the processor is further configured to:
  access a previous backup copy when a current backup copy is not available;
  perform a cyclical redundancy check (CRC) or other check to determine if the data on the previous backup copy and the data on the current backup copy are the same; and
  restore the data using the previous backup copy when the cyclical redundancy check or other check indicates that the data on the previous backup copy and the data on the current backup copy are the same.

19. The system of claim 17, wherein the processor is further configured to:
  perform a cyclical redundancy check (CRC) on a backup file on a logical location of a media type; and
  restore data from a different logical location of a media type when the CRC fails.

20. The system of claim 17, wherein the processor is further configured to:
  assign a first sub job to a backup location;
  perform a cyclical redundancy check or other check on the backup location and a previous backup of the backup location; and
  assign a second sub job to the previous backup when the cyclical redundancy check or other check of the backup location and the previous backup are the same.

* * * * *

UNITED STATES PATENT AND TRADEMARK OFFICE
CERTIFICATE OF CORRECTION

| | | |
|---|---|---|
| PATENT NO. | : 8,161,233 B2 | Page 1 of 1 |
| APPLICATION NO. | : 12/465018 | |
| DATED | : April 17, 2012 | |
| INVENTOR(S) | : Hao Wang | |

It is certified that error appears in the above-identified patent and that said Letters Patent is hereby corrected as shown below:

In column 7, line 27, in Claim 1, delete "sub job" and insert -- sub-job --, therefor.

In column 7, line 37, in Claim 3, delete "D2D2T)" and insert -- (D2D2T) --, therefor.

In column 8, line 6, in Claim 8, delete "sub jobs" and insert -- sub-jobs --, therefor.

In column 8, line 7, in Claim 9, delete "comprising;" and insert -- comprising: --, therefor.

In column 8, line 14, in Claim 10, delete "sub job" and insert -- sub-job --, therefor.

In column 8, line 18, in Claim 10, delete "sub job" and insert -- sub-job --, therefor.

In column 8, line 22, in Claim 11, delete "sub job" and insert -- sub-job --, therefor.

In column 8, line 40, in Claim 13, delete "sub job" and insert -- sub-job --, therefor.

In column 8, line 64, in Claim 16, delete "sub job" and insert -- sub-job --, therefor.

In column 9, line 1, in Claim 16, delete "sub job" and insert -- sub-job --, therefor.

In column 9, line 12, in Claim 17, delete "sub job" and insert -- sub-job --, therefor.

In column 10, line 13, in Claim 20, delete "sub job" and insert -- sub-job --, therefor.

In column 10, line 17, in Claim 20, delete "sub job" and insert -- sub-job --, therefor.

Signed and Sealed this
Third Day of July, 2012

David J. Kappos
*Director of the United States Patent and Trademark Office*